United States Patent
Zhong et al.

(10) Patent No.: US 7,228,025 B1
(45) Date of Patent: Jun. 5, 2007

(54) THIN FILM INTERLEAVER

(75) Inventors: Johnny Zhong, Union City, CA (US); Yin Zhang, San Jose, CA (US); Steve Wang, San Jose, CA (US); Ping Xie, Cupertino, CA (US); Kevin Zhang, Fremont, CA (US)

(73) Assignee: Finisar Corporation, Sunnyvale, CA (US)

( * ) Notice: Subject to any disclaimer, the term of this patent is extended or adjusted under 35 U.S.C. 154(b) by 0 days.

(21) Appl. No.: 10/698,561

(22) Filed: Oct. 31, 2003

Related U.S. Application Data

(60) Provisional application No. 60/422,742, filed on Oct. 31, 2002.

(51) Int. Cl.
G02B 6/26 (2006.01)
G02B 6/42 (2006.01)
G02B 6/32 (2006.01)

(52) U.S. Cl. .................... 385/16; 385/18; 385/20; 385/22; 385/31; 385/33; 385/34; 385/39; 385/47; 385/50

(58) Field of Classification Search .............. 385/16
See application file for complete search history.

(56) References Cited

U.S. PATENT DOCUMENTS

| | | | | |
|---|---|---|---|---|
| 3,924,931 A * | 12/1975 | Cheo | ................ | 385/8 |
| 4,244,045 A * | 1/1981 | Nosu et al. | ................ | 398/86 |
| 4,842,357 A * | 6/1989 | Doneen | ................ | 385/12 |
| 5,710,655 A * | 1/1998 | Rumbaugh et al. | ......... | 359/249 |
| 5,719,989 A * | 2/1998 | Cushing | ................ | 359/589 |
| 5,812,306 A * | 9/1998 | Mizrahi | ................ | 359/341.2 |
| 5,917,626 A * | 6/1999 | Lee | ................ | 398/88 |
| 6,014,485 A * | 1/2000 | Pan | ................ | 385/37 |
| 6,018,421 A * | 1/2000 | Cushing | ................ | 359/589 |
| 6,115,401 A * | 9/2000 | Scobey et al. | ................ | 372/100 |
| 6,125,221 A * | 9/2000 | Bergmann et al. | ................ | 385/33 |
| 6,175,667 B1 * | 1/2001 | Wang et al. | ................ | 385/3 |
| 6,215,592 B1 * | 4/2001 | Pelekhaty | ................ | 359/618 |
| 6,219,481 B1 * | 4/2001 | Cheng | ................ | 385/47 |
| 6,229,934 B1 * | 5/2001 | Melman et al. | ................ | 385/18 |
| 6,256,433 B1 | 7/2001 | Luo et al. | | |
| 6,269,202 B1 * | 7/2001 | Lee et al. | ................ | 385/24 |
| 6,281,997 B1 * | 8/2001 | Alexander et al. | ................ | 398/87 |
| 6,295,147 B1 * | 9/2001 | Yamane et al. | ................ | 398/9 |
| 6,320,996 B1 * | 11/2001 | Scobey et al. | ................ | 385/18 |
| 6,341,040 B1 * | 1/2002 | Tai et al. | ................ | 359/584 |
| 6,421,177 B1 | 7/2002 | Leyva et al. | | |

(Continued)

OTHER PUBLICATIONS

Nick Herring, *The E-Tek Interleaver with Lowest Dispersion*, BFi OPTiLAS, Jun. 20, 2000.

(Continued)

*Primary Examiner*—Frank G. Font
*Assistant Examiner*—Ryan Lepisto
(74) *Attorney, Agent, or Firm*—Workman Nydegger

(57) ABSTRACT

A thin film interleaver device is disclosed. The thin film interleaver includes thin film optics. The thin film(s) are formed such that they reflect one group of wavelengths while allowing a second group of wavelengths to pass through the thin film(s). The thin film(s) exhibit a flat top frequency response across the channel bandwidths of the multiplexed signal for which the thin film filter is designed such that the thin film interleaver is less sensitive to wavelength drift and temperature variations.

15 Claims, 4 Drawing Sheets

U.S. PATENT DOCUMENTS

| | | | |
|---|---|---|---|
| 6,459,844 B1* | 10/2002 | Pan | 385/140 |
| 6,486,988 B1* | 11/2002 | Lewis et al. | 398/83 |
| 6,490,381 B1* | 12/2002 | Adair et al. | 385/16 |
| 6,567,196 B1* | 5/2003 | Archambault | 398/79 |
| 6,611,378 B1* | 8/2003 | Wang et al. | 359/588 |
| 6,658,172 B1* | 12/2003 | Scobey et al. | 385/15 |
| 6,678,093 B1* | 1/2004 | Scobey et al. | 359/578 |
| 6,704,469 B1* | 3/2004 | Xie et al. | 385/11 |
| 6,721,100 B2* | 4/2004 | Tilsch | 359/578 |
| 6,785,002 B2* | 8/2004 | Zarrabian et al. | 356/454 |
| 6,792,210 B1* | 9/2004 | Hallock et al. | 398/83 |
| 6,831,784 B2* | 12/2004 | Takeda | 359/579 |
| 2002/0118417 A1* | 8/2002 | Barry et al. | 359/127 |
| 2002/0131047 A1* | 9/2002 | Zarrabian et al. | 356/454 |
| 2003/0012230 A1* | 1/2003 | Hopkins et al. | 372/20 |
| 2003/0048985 A1* | 3/2003 | Hulse | 385/27 |
| 2003/0086176 A1* | 5/2003 | Tilsch | 359/578 |
| 2003/0123827 A1* | 7/2003 | Salerno et al. | 385/129 |
| 2003/0147136 A1* | 8/2003 | Pan et al. | 359/484 |
| 2003/0147578 A1* | 8/2003 | Pan et al. | 385/11 |
| 2003/0185513 A1* | 10/2003 | Hellman et al. | 385/47 |
| 2005/0030611 A1* | 2/2005 | Fukshima et al. | 359/321 |
| 2005/0031258 A1* | 2/2005 | Chiu et al. | 385/24 |

OTHER PUBLICATIONS

Stephane Bourgeois, *Fused-Fiber Developments: Offer Passive Foundation for Optical Slicing*, Lightwave Special Report, Mar. 4, 2000.

Joseph C. Chon et al., *Ultra-high Capacity and High Speed DWDM Optical Devices for Telecom and Datacom Application*, Proceedings of SPIE, vol. 4581, 2001, pp. 13-20.

Wavesplitter Lighting the Internet on Fiber Catalog, *Creating Unique Advantages Together*, WaveProcessor $F^3T$ Interleaver, Feb. 2002.

* cited by examiner

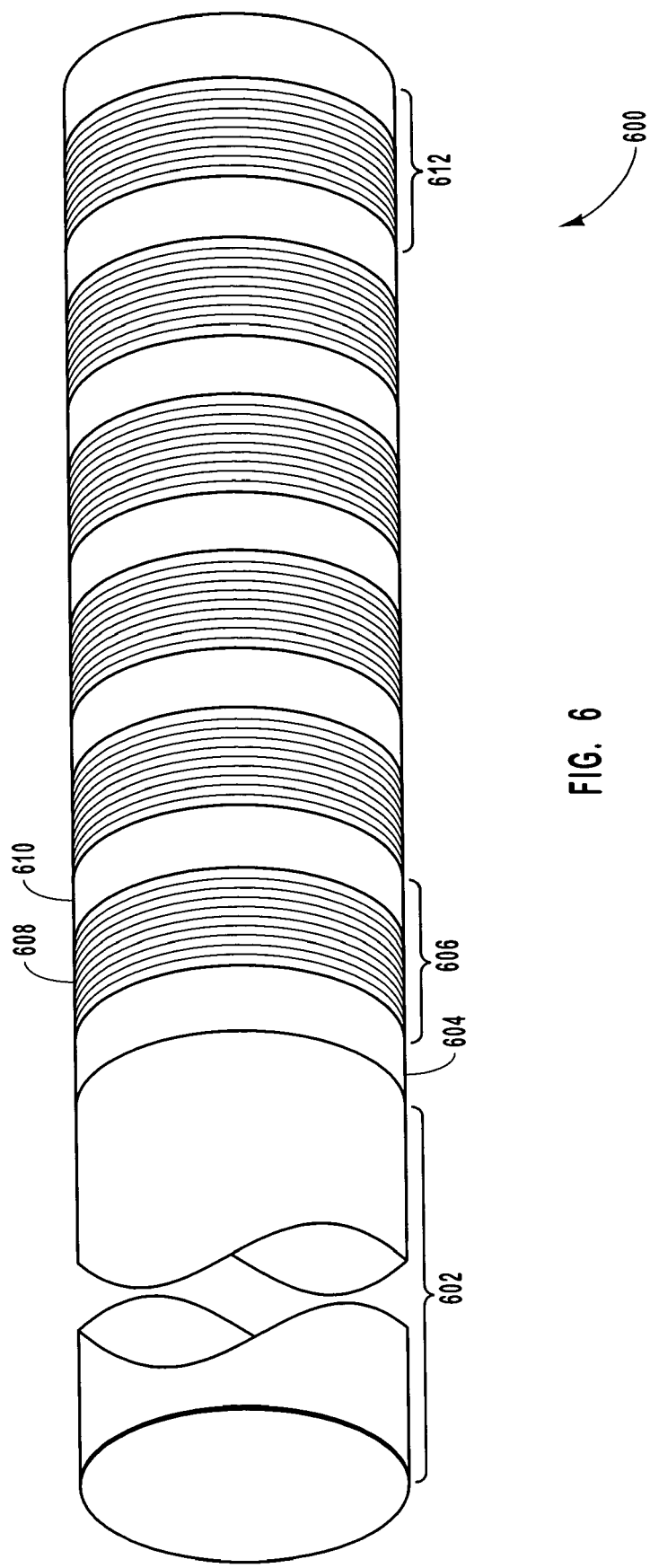

THIN FILM INTERLEAVER

CROSS-REFERENCE TO RELATED APPLICATIONS

This application claims the benefit of U.S. Provisional Application No. 60/422,742, titled THIN FILM INTERLEAVER filed Oct. 31, 2002, which is incorporated herein by reference.

BACKGROUND OF THE INVENTION

1. The Field of the Invention

The present invention relates to systems and methods for interleaving optical signals. More specifically, the present invention relates to a thin film interleaver for use in Coarse Wavelength Division Multiplexing (CWDM) optical networks and more particularly to a thin film interleaver that is less sensitive to wavelength drift and temperature variations.

2. Description of the Related Art

One goal of optical fiber networks is to maximize the amount of data or information that can be transmitted through a single fiber. One way of increasing the amount of data traffic on a fiber optic network is by using various types of multiplexing arrangements. One type of multiplexing is based on simultaneously sending data through the same optical fiber using multiple carrier signals or beams. Each of the carrier beams has a different frequency or wavelength than the other carrier beams on a particular fiber. This type of multiplexing is commonly referred to as wavelength division multiplexing (WDM). Two types of WDM systems are CWDM and Dense Wavelength Division Multiplexing (DWDM). In CWDM, for example, signals are sent using lasers with wavelengths that are between 1370 nm and 1610 nm at 20 nm increments.

One of the optical components that is often used in WDM systems is an interleaver. Generally, an interleaver is an optical component that can be used as both a multiplexer and a demultiplexer. When used as a multiplexer, the interleaver can combine the optical signals carried by a pair of optical fibers into a single optical signal on a single optical fiber. For example, if the optical signals being combined each include four separate channels (wavelengths), then the optical signal output by the interleaver will carry eight channels (wavelengths) that are spaced closer together. When used as a demultiplexer, the interleaver separates a single optical signal into a pair of optical signals each carried by different optical fibers. In this case, the channels are more widely spaced.

FIG. 1 illustrates an exemplary interleaver currently available, which is generally designated at 100. The interleaver 100 is manufactured using a fused fiber technique. In this example, two optical fibers are twisted together. Then, the optical fibers are heated at the point where they are connected, the fiber junction 108, causing the fibers to fuse. While still in a heated condition, the twisted and fused fibers are then pulled or stretched to obtain the desired optical characteristics. In the interleaver 100, the fused fiber technique results in a three or four port device that includes, in this example of a three port device, an input fiber 102, an output fiber 104 and an output fiber 106.

The input fiber 102 carries a signal that includes several different channels of various wavelengths. In one example, eight carrier signals or channels are included in the optical signal and are represented as channels $\lambda_1$, $\lambda_2$, $\lambda_3$, $\lambda_4$, $\lambda_5$, $\lambda_6$, $\lambda_7$ and $\lambda_8$, where each $\lambda_n$ represents a particular carrier, wavelength or channel. Although eight channels are illustrated in this example, other systems may use more or fewer channels. In a CWDM system, for example, the channel designated as $\lambda_1$ may correspond to the 1470 nm wavelength, the channel designated as $\lambda_2$ may be the channel spaced at the next 20 nm interval (1490 nm), and so forth.

Returning now to the example in FIG. 1, the multiplexed signal propagates to the fiber junction 108 where the optical fibers have been fused. Because of the way in which the fibers have been fused, the interleaver 100 divides the channels into two separate groups. The first group is represented by the wavelengths $\lambda_2$, $\lambda_4$, $\lambda_6$, and $\lambda_8$. The second group is represented by the wavelengths $\lambda_1$, $\lambda_3$, $\lambda_5$, and $\lambda_7$. The first group of wavelengths propagates on the output fiber 104. The second group propagates on the output fiber 106. The output fibers 104 and 106 may be connected to subsequent fused fiber interleavers that further deinterleave the channels. The channels output of the interleaver 100 on the output fibers 104 and 106 are less densely spaced (i.e., 2× channel spacing of 102) than the channels on the input fiber 102.

One of the challenges in modern optical multiplexing systems is addressing the temperature sensitivities of the optical equipment. For example, the DFB lasers that are commonly used in a CWDM system to generate the various channels change the wavelength of their output beam according to the temperature at which the lasers are operating. Because of the sensitivity of the carrier wavelength to temperature, a particular channel may need a bandwidth in some applications that may be, for example, +/−6 nm from the defined carrier channel wavelength. Further, the fused fiber interleaver device itself has some temperature sensitivities. As described previously, the optical characteristics of the fused fiber interleaver are obtained by stretching the glass fibers while they are in a heated condition. Changes in temperature cause the interleaver device to expand or contract, thus changing the optical characteristics of the interleaver.

FIG. 2 shows a graph illustrating the wavelength response of a fused fiber interleaver illustrated in FIG. 1. The wavelength response, illustrated by the curves 210, of a typical fused fiber interleaver is Gaussian. A typical Gaussian response exhibits low loss around the center carrier wavelength. As the channel wavelength drifts away from the carrier wavelength, the response quickly drops off, resulting in higher signal loss. In other words, wavelength drift can result is significant signal loss. Generally, small frequency shifts and corresponding small signal power losses are tolerable. Heavy losses of signal power are less tolerable, as they can reduce the distances over which the optical network can be deployed and can increase error rates.

In addition to wavelength drift and temperature variations, frequency dependent loss and cross talk are other examples of component characteristics that have an impact on the performance of optical components. Interleavers are often integrated into other optical components such as optical add/drop modules (OADM) and interleavers therefore have an impact on the performance characteristics of those optical components.

One method of reducing power loss of a fused-fiber interleaver that exhibits a Gaussian top frequency response is to widen the Gaussian response to provide a wider frequency response. A drawback from having a wider frequency response is that adjacent channels become less isolated as the actual frequency varies from the defined channel frequency. This breakdown of isolation is sometimes referred to as cross-talk. Cross-talk results in data from one channel being mixed into adjacent channels thus making the data on the adjacent channel more difficult or impossible to extract.

To reduce cross talk problems, the frequency response is shaped so that the losses are high as a particular frequency on a channel drifts towards other channels. Adjusting either the frequency dependent loss or cross talk performance characteristics has an adverse affect on the other.

BRIEF SUMMARY OF THE INVENTION

These and other limitations are overcome by the present invention which relates to thin film interleavers. One advantage of the present invention is that the response of the thin film interleaver is wider than a typical Gaussian response. Thus, wavelength drift becomes more tolerable. At the same time, the response of the thin film interleaver does not result in cross talk even though the response is wider. In effect, the response of the thin film interleaver is more flat than a typical Gaussian response.

The thin film interleaver includes, in one embodiment, a dual fiber collimator that has an input fiber and a reflection fiber. A thin film is attached on the dual fiber collimator. The thin film is designed such that it exhibits a flat top frequency response and such that it reflects a first set of wavelengths while allowing a second set of wavelengths to pass through the thin film. Each of the wavelengths in the first set is adjacent to one of the wavelengths in the second set of wavelengths in one embodiment. The thin film interleaver exhibits lower insertion loss across the bandwidth of channels and exhibits lower cross talk between adjacent channels.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which:

FIG. 6 illustrates an exemplary structure of a thin-film interleaver.

DETAILED DESCRIPTION OF THE INVENTION

Interleavers are optical elements or components that can be used for a variety of different purposes. Often, interleavers are used in multiplexing or demultiplexing optical elements as well as in add/drop multiplexers to separate or combine two sets of optical signals. Fused fiber interleavers have a Gaussian response. Thus, the signal loss of a fused fiber interleaver can increase when the interleaver or optical signals are subject, for example, to wavelength drift, temperature variations, and the like.

The present invention relates to interleavers and more particularly to a thin film interleaver. A thin film interleaver has the advantage of providing an improved frequency response that is not as susceptible to wavelength drift and temperature variations. The present invention also relates to optical elements such as multiplexers and demultiplexers that incorporate both fused fiber interleavers and thin film interleavers.

In one embodiment of a thin film interleaver, a thin film portion including multiple layers of thin films are applied to an optical substrate. The thin films can be applied to the optical substrate in any of several ways, including chemical deposition, vapor deposition or by growing the thin film portion on the optical substrate. By varying the thicknesses of each cavity and the indices of refraction of each layer included in each cavity of the thin film portion, the optical properties of the thin film portion can be defined and controlled. Further, the wavelength response of the thin film interleaver can be shaped to meet a particular specification.

Figure 3:
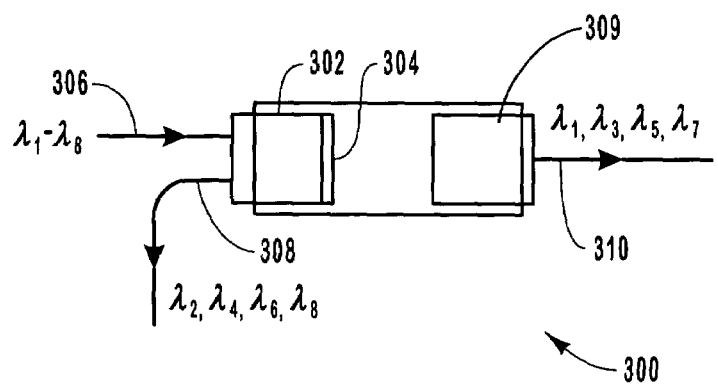
FIG. 3 illustrates one embodiment of a thin-film interleaver.

An illustrative embodiment of a thin film interleaver is shown in FIG. 3 and illustrated generally as an interleaver 300. The interleaver 300 includes, in this example, a thin film portion 304 that is deposited or applied to an optical substrate on a dual fiber collimator 302. The thin film portion 304 may, in some embodiments, include more than one thin film. The dual fiber collimator includes two fibers, namely an input fiber 306 and a reflection fiber 308. In one embodiment of the invention, the dual fiber collimator includes a graded index (GRIN) or other type of lens for collimating light on the thin film optics.

The interleaver 300 is illustrated as performing a deinterleaving function on an optical signal received through the input fiber 306. The optical signal may be a CWDM signal or other WDM signal that includes more than one carrier signal. In this example, the optical signal includes eight carrier signals of different wavelengths. The thin film portion 304 is designed such that a first group of channels passes through the thin film portion 304 while a second group of channels is reflected into the reflection fiber 308. The first group of channels includes channels designated in FIG. 3 as $\lambda_1$, $\lambda_3$, $\lambda_5$, and $\lambda_7$. The first group of channels are collimated into a single fiber collimator 309 where they are propagated onto an output fiber 310. The second group of channels are designated in FIG. 3 as $\lambda_2$, $\lambda_4$, $\lambda_6$, and $\lambda_8$ and exit the fiber 308. If the dual fiber collimator includes a lens such as an aspheric lens, an additional separate lens may need to be located between the dual fiber collimator and the single fiber collimator where the separate lens includes the thin film portion 304.

In one embodiment of a CWDM multiplexing system, each adjacent channel carrier wavelength is separated by 20 nm from the preceding and subsequent channel wavelengths. For example $\lambda_1$ may represent a 1470 nm wavelength. The next channel designated by $\lambda_2$ is separated by a 20 nm interval, at 1490 nm etc. The thin film optics is designed to divide the wavelengths that comprise a multiplexed signal into two groups where each group includes every other channel that was included in the original optical signal. One advantage of the interleaver 300 is that the channels carried by the output fiber 310 and the reflection fiber 308 have double the spacing of the channels or signals carried by the fiber 306 and received by the interleaver 300.

Figure 1:
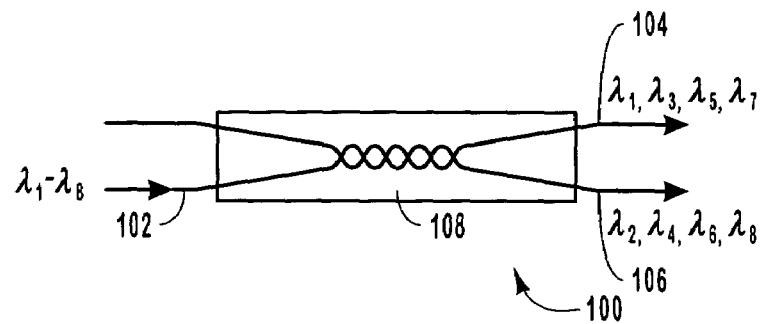
FIG. 1 illustrates a prior art implementation of a fused fiber interleaver device.
Figure 2:
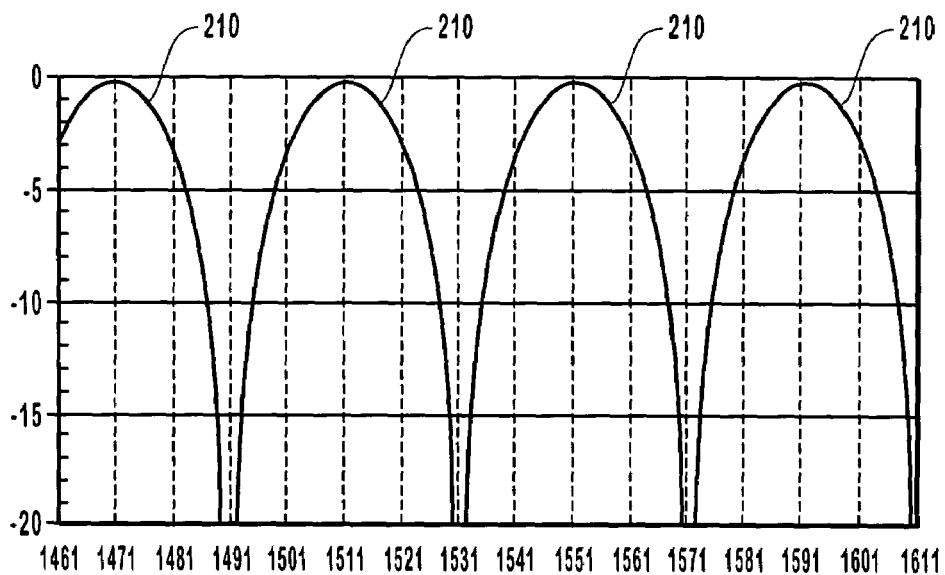
FIG. 2 is a frequency response graph of the fused fiber interleaver illustrated in FIG. 1.
Figure 4:
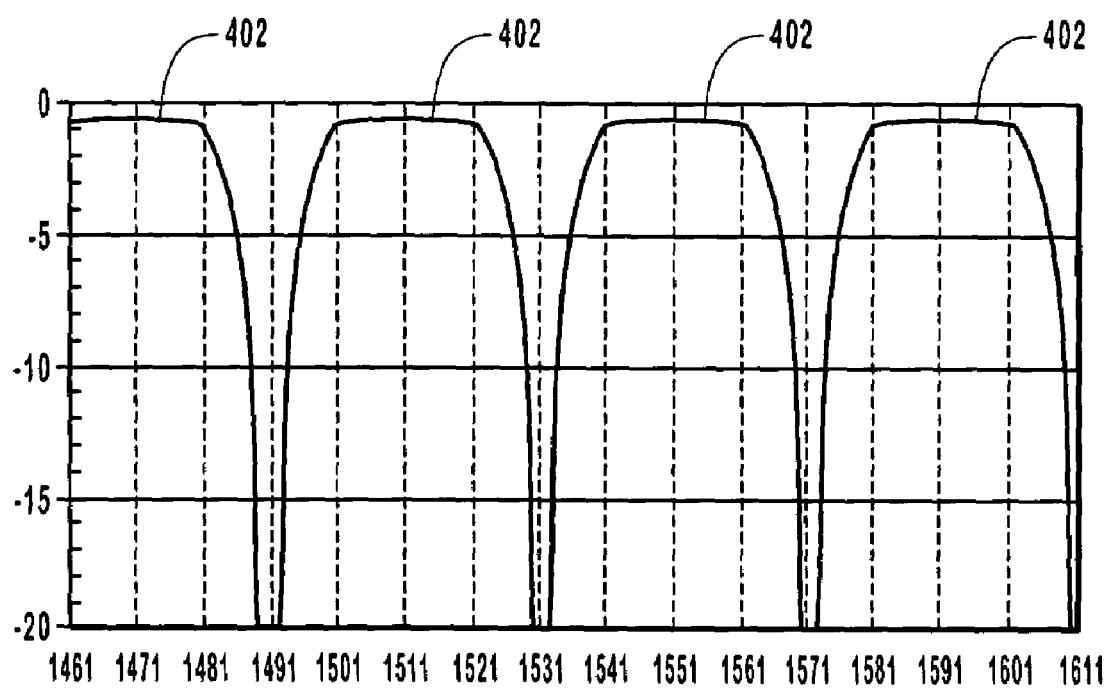
FIG. 4 is a frequency response graph of the thin-film interleaver device shown in FIG. 3.

The signal loss of the interleaver 300 is reduced in some situations because the thin film portion 304 exhibits a flat top frequency response instead of the Gaussian response that is typical of fused fiber interleavers. In FIG. 4, a typical flat top response 402 of the thin film interleaver 300 is shown. FIG. 4 illustrates that the frequency response is more constant within a given range of wavelengths compared to the Gaussian response illustrated in FIG. 2. The Gaussian response of FIG. 2 indicates that the loss of a particular carrier signal is greater as the wavelength of the carrier signal begins to drift than the loss of the thin film filter as illustrated in FIG. 4. More specifically, the response 402 exhibits a flat top response that makes the interleaver less sensitive to wavelength drift, temperature variations, and other factors that affect the carrier signals in a CWDM system.

Figure 5:
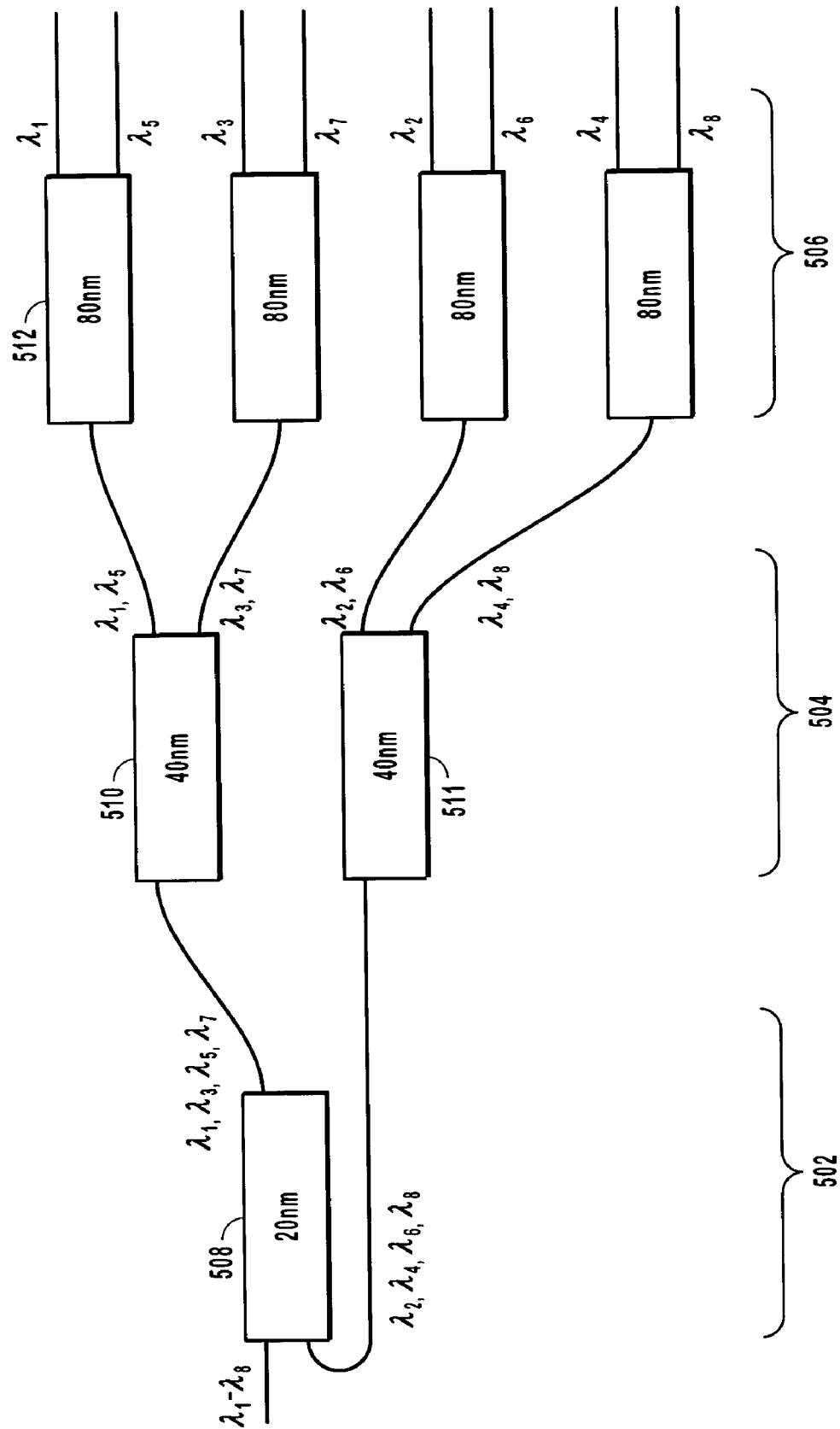
FIG. 5 illustrates the combination of several cascading interleaver devices.

While maintaining low loss of the carrier signal when small changes in the carrier signal are experienced, the thin film interleaver 300 maintains appropriate channel separation. The flat top response 402 exhibits rapid signal loss as the carrier frequency approaches the bandwidth of adjacent channels, resulting in lower cross talk. Often, an interleaver can be employed in stages to perform both multiplexing and demultiplexing functions. In both multiplexing and demultiplexing, for example, there are typically several stages where interleavers are utilized. FIG. 5 illustrates an example of interleavers used to form a demultiplexer. In FIG. 5, the interleavers are used to demultiplex an optical signal stream that includes eight channels or separate signals that each have a different wavelength. The interleaver 508 of the first stage 502 receives the optical signal and deinterleaves the signal into two groups of alternating signals. The original optical signal had signals that were spaced at 20 nm, in this example. The output of the first stage 502 results in optical signals where the channels are spaced at 40 nm on each output. The first stage 502, which is the most densely packed stage, is therefore the stage where it is more useful to utilize a thin film interleaver as described herein to insure that the optical signals are not attenuated or lost as they pass through the interleaver 508, while maintaining lower cross talk due to a flat top frequency response. The remaining interleavers can, in some embodiments, all be fused fiber interleavers.

The stage 504 includes interleavers 510 and 511, which are fused fiber interleavers but can also be implemented using thin film interleavers. Fused fiber interleavers are used in this example because the response is not as critical as the response of the first stage 502 and the fused fiber interleavers are less expensive. The second stage 504 further separates the channels such that each optical fiber exiting the second stage 504 includes two signals that are even further spaced apart. The final stage 506 of FIG. 5 includes a group of interleavers 512 and fully demultiplexes the original optical signal such that each output fiber of the stage 506 only carries a single wavelength.

The invention includes embodiment where thin film interleavers are utilized in conjunction with fused fiber interleavers. It has been empirically determined that most of the errors from temperature sensitivities are generated in the stage where the channels are most densely packed. Therefore, while the critical stage may be constructed using the thin film interleaver, subsequent stages using fused fiber interleavers may be acceptable, depending on the application and the requirements of the demultiplexing system.

FIG. 6 illustrates one example of the internal construction of a thin film interleaver that is shown and designated generally as 600. FIG. 6 is not drawn to scale as the concepts behind the construction of a thin film interleaver 600 can be better understood from this non-scale drawing. The thin film interleaver 600 is fabricated on an optical substrate 602. A first matching layer 604 is coupled to the optical substrate. The matching layer 604 has an index of refraction that provides for an efficient interface between the optical substrate 602 and the remaining thin film(s). An efficient interface for matching the optical substrate 602 and the remaining thin films may be designed such that:

$$n_{interface} = \sqrt{n_{substrate} * n_{film}}$$

where $n_{interface}$ is the index of refraction of the efficient interface, $n_{substrate}$ may be the index of refraction of the optical substrate 602 and $n_{film}$ may be the index of refraction of a thin film coupled to the efficient interface.

In one embodiment, four to six cavities are fabricated in the thin film interleaver 600. A cavity 606 typically includes multiple thin film layers 608 and a spacer 610. The spacer may be designed in one embodiment of the invention such that it conforms to:

$$FSR = \frac{c}{2nd}$$

where FSR is the free spectral range or channel spacing, c is the speed of light, n is the index of refraction of the spacer, and d is the spacer length.

The thin films and cavities of the interleaver 600 function on interference filters that consist of multiple alternating quarter-wavelength-thick layers of high refractive index and low refractive index. Light reflected within the layers of high index does not shift its phase, whereas light within low index shifts by 180°. Taking into account travel difference in multiples of 2× quarter-wavelength-thickness, the successive reflections recombine constructively at the front face of the thin film optics, producing a highly reflected light beam for certain wavelengths. These reflected wavelengths, however, become destructed in the transmitted path. The thin films 608 are fabricated such that the desired interleaving function is accomplished. Generally, to achieve the interleaving function 72 to 74 thin film layers may be required. Because the interleaver is intended to be used with a multiplexed signal comprising various wavelengths, the wavelengths used to define the thin film thickness may be a median wavelength of the wavelengths intended for the particular interleaver device.

Returning now to FIG. 6, several additional cavities similar to the first cavity 606 are serially applied to the optical substrate 602 to refine the frequency response to be as flat as possible. The final cavity 612 has a spacer that comprises a matching layer designed with an index of refraction intended to match the surrounding air and interleaver device 600. In one embodiment of the invention, the final cavity 612 has a spacer that conforms to:

$$n_{spacer} = \sqrt{n_{air} * n_{coll}}$$

where $n_{spacer}$ is the index of refraction of the spacer on the final cavity 612, $n_{air}$ is the index of refraction of the surrounding air, and $n_{coll}$ is the index of refraction of the interleaver device.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A thin film interleaver, the thin film interleaver comprising:
    a dual fiber collimator comprising:
        an optical substrate;
        a thin film portion applied to the optical substrate, the thin film portion formed to allow a first group of channels to pass through the thin film portion while reflecting a second group of channels, each channel of the first group of channels being adjacent to at least one of the channels in the second group of channels such that channels in the first group are arranged in alternating fashion with respect to channels in the second group, and the thin film portion comprising at least a first cavity that includes a plurality of thin film layers and a spacer;
        a matching layer interposed between the optical substrate and the thin film portion, the matching layer being arranged such that the thin film layers of the first cavity are positioned between the matching layer and the spacer of the first cavity;
        an input fiber for receiving an optical signal comprised of the first and second groups of channels; and
        a reflection fiber for receiving the second group of channels after they have been reflected by the thin film portion.

2. The thin film interleaver of claim 1, further comprising a single fiber collimator optically coupled to the dual fiber collimator for receiving the first group of channels after the first group of channels passes through the thin film portion.

3. The thin film interleaver of claim 2, wherein the dual fiber collimator further comprises a lens in optical communication with the single fiber collimator.

4. The thin film interleaver of claim 3, wherein the lens includes the thin film portion of the dual fiber collimator.

5. The thin film interleaver of claim 4, wherein the lens comprises an aspheric lens.

6. The thin film interleaver of claim 1, the thin film portion comprising 4 to 6 cavities.

7. The thin film interleaver of claim 1, wherein the thin film portion comprises a plurality of cavities, each of the plurality of cavities comprising 72 to 74 thin film layers.

8. The thin film interleaver of claim 1, each thin film layer having a thickness of about ¼ of a median wavelength, the median wavelength being that of the median channel of the first and second group of channels.

9. The thin film interleaver of claim 1, wherein the thin film portion comprises a plurality of cavities, one of the plurality of cavities being disposed at the end of the plurality of cavities having a spacer with an index of refraction for matching the dual fiber collimator to air surrounding the dual fiber collimator.

10. The thin film interleaver of claim 1, wherein the thin film portion is configured such that a plurality of thin film layers is disposed at a first end of the thin film portion, and a spacer is disposed at a second end of the thin film portion.

11. The thin film interleaver of claim 1, wherein the substrate comprises a portion of a GRIN lens.

12. The thin film interleaver of claim 1, wherein the dual fiber collimator further comprises a lens that is in optical communication with at least one other element of the thin film interleaver.

13. The thin film interleaver of claim 12, wherein the lens comprises an aspheric lens.

14. The thin film interleaver of claim 1, wherein spacing between adjacent channels is about 20 nm.

15. The thin film interleaver of claim 1, wherein spacing of the channels carried by the reflection fiber is a multiple of the spacing of channels received at the input fiber.

* * * * *